United States Patent
Sreedhara

(10) Patent No.: US 12,287,820 B2
(45) Date of Patent: *Apr. 29, 2025

(54) SYSTEMS AND METHODS FOR CORRECTING A VOICE QUERY BASED ON A SUBSEQUENT VOICE QUERY WITH A LOWER PRONUNCIATION RATE

(71) Applicant: Adeia Guides Inc., San Jose, CA (US)

(72) Inventor: Arun Sreedhara, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,389

(22) Filed: Nov. 9, 2023

(65) Prior Publication Data

US 2024/0134896 A1 Apr. 25, 2024

Related U.S. Application Data

(63) Continuation of application No. 17/838,804, filed on Jun. 13, 2022, now Pat. No. 11,853,338, which is a (Continued)

(51) Int. Cl.
*G10L 15/22* (2006.01)
*G06F 16/3329* (2025.01)
(Continued)

(52) U.S. Cl.
CPC .......... *G06F 16/34* (2019.01); *G06F 16/3329* (2019.01); *G06F 16/90332* (2019.01);
(Continued)

(58) Field of Classification Search
CPC .... G06F 16/34; G06F 16/3329; G06F 16/332; G06F 16/90332; G06F 16/9032;
(Continued)

(56) References Cited

U.S. PATENT DOCUMENTS 9,443,514 B1 9/2016 Taubman
10,430,449 B2 10/2019 Sreedhara
(Continued)

OTHER PUBLICATIONS

Isidoro , "Google's Knowledge Graph: One step closer to the semantic web?", http://econsultancy.com/blog/62241-google-s-knowledge-graph-one-step-closer-to-the-semantic-web?, 8 pages, Feb. 28, 2013.

*Primary Examiner* — Huyen X Vo
(74) *Attorney, Agent, or Firm* — Haley Guiliano LLP

(57) ABSTRACT

Systems and methods for correcting a voice query based on a subsequent voice query with a lower pronunciation rate. In some aspects, the systems and methods calculate first and second pronunciation rates of first and second voice queries. The systems and methods determine that the second pronunciation rate is lower than the first pronunciation rate and determine a first candidate pronunciation time for a first candidate word from the first voice query. The systems and methods determine a second candidate pronunciation time, adjusted to the first pronunciation rate, for the second candidate word from the second voice query. The systems and methods determine that the first candidate pronunciation time matches the second candidate pronunciation time and generate a third voice query based on the first voice query by replacing the first candidate word with the second candidate word.

20 Claims, 8 Drawing Sheets

Related U.S. Application Data continuation of application No. 16/922,103, filed on Jul. 7, 2020, now Pat. No. 11,386,134, which is a continuation of application No. 16/545,201, filed on Aug. 20, 2019, now Pat. No. 10,747,799, which is a continuation of application No. 15/471,681, filed on Mar. 28, 2017, now Pat. No. 10,430,449.

(51) Int. Cl.
  *G06F 16/34* (2019.01)
  *G06F 16/9032* (2019.01)
  *G10L 15/18* (2013.01)
  *G10L 15/01* (2013.01)

(52) U.S. Cl.
  CPC .......... *G10L 15/1807* (2013.01); *G10L 15/22* (2013.01); *G10L 15/01* (2013.01); *G10L 2015/223* (2013.01); *G10L 2015/227* (2013.01)

(58) Field of Classification Search
  CPC ..... G10L 15/1807; G10L 15/18; G10L 15/01; G10L 2015/223; G10L 2015/227; G10L 15/22

See application file for complete search history.

(56) References Cited

U.S. PATENT DOCUMENTS

| | | | |
|---|---|---|---|
| 10,747,799 B2 | 8/2020 | Sreedhara | |
| 11,386,134 B2 | 7/2022 | Sreedhara | |
| 2004/0176953 A1* | 9/2004 | Coyle | G10L 15/22 |
| | | | 704/E15.04 |
| 2008/0101556 A1* | 5/2008 | Kim | G10L 15/01 |
| | | | 379/88.04 |
| 2015/0111183 A1* | 4/2015 | Koyama | G10L 25/60 |
| | | | 434/185 |
| 2015/0348570 A1 | 12/2015 | Feast et al. | |
| 2018/0130465 A1 | 5/2018 | Kim | |
| 2018/0286390 A1 | 10/2018 | Sreedhara | |
| 2020/0073880 A1 | 3/2020 | Sreedhara | |
| 2020/0334281 A1 | 10/2020 | Sreedhara | |
| 2023/0029107 A1 | 1/2023 | Sreedhara | |

\* cited by examiner

SYSTEMS AND METHODS FOR CORRECTING A VOICE QUERY BASED ON A SUBSEQUENT VOICE QUERY WITH A LOWER PRONUNCIATION RATE

CROSS-REFERENCE TO RELATED APPLICATIONS

This patent application is a continuation of U.S. patent application Ser. No. 17/838,804, filed Jun. 13, 2022, which is a continuation of U.S. patent application Ser. No. 16/922, 103, filed Jul. 7, 2020, now U.S. Pat. No. 11,386,134, which is a continuation of U.S. patent application Ser. No. 16/545, 201, filed Aug. 20, 2019, now U.S. Pat. No. 10,747,799, which is a continuation of U.S. patent application Ser. No. 15/471,681, filed Mar. 28, 2017, now U.S. Pat. No. 10,430, 449, the disclosures of which are hereby incorporated by reference herein in their entireties.

BACKGROUND

Often a user attempts to use a voice query to request a media guidance application to perform a search or another suitable action. Sometimes, the media guidance application may misinterpret that voice query and search for something different. In conventional systems, the user has to repeat the whole query again in order to correct the initial voice query. This can be frustrating and time consuming for the user. For example, the user may ask the media guidance application to search for the schedule of a Boston team by pronouncing the voice query "When is the Boston team playing?" The media guidance application may misinterpret the query as "When is the Austin team playing?" and search for the wrong team's schedule. The user will have to repeat the initial voice query "When is the Boston team playing?" in order to obtain the needed schedule, making the user's experience frustrating and time consuming.

SUMMARY

Systems and methods are provided herein for correcting a voice query based on a subsequent voice query with a lower pronunciation rate. As used herein, the term "pronunciation rate" is defined to mean a rate at which the user is pronouncing the words in a query. An example of a pronunciation rate is words per second. For example, the user can ask the media guidance application "When is the Boston team playing?" The query might be misinterpreted as "When is the Austin team playing?" and the user might try to correct the initial query by slowly saying "No, I meant, Boston." The media guidance application will then identify "Austin" as the word that the user is trying to correct, because the pronunciation time of the word "Boston" is closest to the pronunciation time of the word "Austin." Pronunciation time may be referred to as spell time. The media guidance application will also take into account the relative speed with which the user is pronouncing the sentence to estimate the pronunciation time. For example, the media guidance application will take into account that the user pronounces "No, I meant, Boston" lower.

In some aspects, the media guidance application may receive a voice query from the user. For example, the media guidance application may hear the user say "When is the Boston team playing?" but misinterpret the query as "When is the Austin team playing?" The media guidance application may determine the set of words in the query. For example, the media guidance application may determine that there are six words in the query: "when," "is," "the," "Austin," "team," and "playing." The media guidance application may determine the pronunciation time for the query. For example, the media guidance application may determine that the user took 3 seconds to pronounce the query. The media guidance application may calculate the pronunciation rate of the voice query. For example, the media guidance application may calculate the pronunciation rate to be 2 words per second (wps). The media guidance application may receive a new voice query from the user. For example, the media guidance application may hear the user slowly say "No, I meant Boston." The media guidance application may calculate the pronunciation rate of the new voice query. For example, the media guidance application may calculate the new pronunciation rate to be 1 wps. The media guidance application may conclude that because the new pronunciation rate is lower than the initial voice query, the user is trying to correct the initial voice query with the new voice query.

The media guidance application may generate an adjusted voice query, which is the repeated voice query but at the first pronunciation rate. For example, the media guidance application may generate the adjusted voice query as being "No, I meant, Boston" but played twice as fast as the original new query, so that the pronunciation rate of the adjusted voice query is 1 wps. The media guidance application may compare the pronunciation time of a word from the initial voice query and a word from the adjusted voice query to determine if the pronunciation times match. For example, the media guidance application may select the word "Austin" from the initial voice query, and the word "Boston" from the adjusted voice query and determine that their pronunciation times match. Further, the media guidance application may generate a corrected voice query that is the initial voice query with the word from the adjusted voice query that matches the pronunciation time of the word in the initial voice query. For example, the media guidance application may generate a corrected voice query being "When is the Boston team playing?" The media guidance application may generate for display the results of the corrected voice query. For example, the media guidance application may display the schedule of the Boston team playing.

In some embodiments, the media guidance application may correct the initial query using a set of stored templates. The media guidance application may replace words in the initial query with words from the new query by computing a score based on grammar templates stored in the local or remote storage. The media guidance application may weigh the templates based on the usage frequency of the templates.

In order to determine the words in a query, in some embodiments, the media guidance application may determine a set of pauses in the query. For example, the media guidance application may determine that there are seven pauses, including one before the first "When" and one after "playing." Further, the media guidance application may select two consecutive pauses. For example, the media guidance application may select the fourth and fifth pause from the seven pauses identified above. The media guidance application may then determine a word than is located between the two consecutive pauses. For example, the media guidance application may determine "Austin" as a word in the query.

In order to determine the pronunciation rate of a query, in some embodiments, the media guidance application may determine the number of pauses in the query. For example, the media guidance application may determine that there are seven pauses in the query. The media guidance application may determine the number as one less than the number of pauses. For example, the media guidance application may determine that there are seven pauses and thus six words in the query. The media guidance application may calculate the pronunciation rate of the query based on the number of words and the pronunciation time of the query. For example, the media guidance application may determine that the pronunciation rate is 2 wps because there are six words and the pronunciation time of the query is 3 seconds.

In order to determine a pronunciation time of a word in a query, in some embodiments, the media guidance application may determine a pause that is located immediately before the word and determine the time at which that pause is over. For example, the media guidance application may determine that the fourth pause, the pause before the word "Austin," is over at 1.5 seconds. The media guidance application may determine a pause that is located immediately after the word and determine the time at which that pause starts. For example, the media guidance application may determine that the fifth pause, the pause after the word "Austin," starts at 2 seconds. The media guidance application may determine the pronunciation time of a word as the difference between the time of the start of the pause after the word and the time of the end of the pause before the word. For example, the media guidance application may determine that the word "Austin" has a pronunciation time of 0.5 seconds (2 seconds minus 1.5 seconds). In the case when the pronunciation times of the word from the initial query and adjusted query do not match, in some embodiments, the media guidance application may pick a new word from the initial query. For example, the media guidance application may determine that the pronunciation time of the word "When," from the initial query and the word "meant" from the adjusted query do not match and pick the word "Austin," from the initial query to compare to the word "meant." Alternatively, the media guidance application may pick a new word from the adjusted query. For example, the media guidance application may pick the word "Boston," from the adjusted query, to compare to the word "When," from the initial query. Alternatively, the media guidance application may pick a new word from the initial query and a new word from the adjusted query. For example, the media guidance application may pick the word "Austin," from the initial query and the word "Boston," from the adjusted query.

In order to determine whether the pronunciation times of the word from the initial query and adjusted query match, in some embodiments, the media guidance application may receive a threshold deviation time. As defined herein, the term "threshold deviation time" is defined to mean a maximum pronunciation time difference between the words, which will still result in the media guidance application determining that the pronunciation times of the two words match. For example, the media guidance application may receive a 5 milliseconds (ms) threshold deviation time. The media guidance application may determine the difference between the pronunciation times of the two words. For example, the media guidance application may determine that the word "Austin" has a pronunciation time of 500 ms and the word "Boston" has a pronunciation time of 503 ms. The media guidance application may determine that the words match if the time difference between the pronunciation times is smaller than the threshold deviation time. For example, the media guidance application may determine that the word "Austin" and "Boston" match since the difference in their pronunciation times is only 3 ms, which is smaller than the 5 ms corresponding to the threshold deviation time.

In some embodiments, the media guidance application may display the corrected query to the user and allow the user to confirm that the query is correct. For example, the media guidance application may display to the user the corrected query "When is the Boston team playing?" for the user to confirm that the query is a correct one. The media guidance application may, after the user has confirmed that the corrected query is correct, display search results corresponding to the corrected query. For example, the media guidance application may display schedules for the Boston team.

In some embodiments, the media guidance application may receive an input from the user indicating that the corrected query is wrong. For example, the user may receive a corrected query saying "When is the Austin team meant?" and indicate that the query is wrong. The media guidance application may then receive another query from the user trying to correct the initial query. For example, the user can slowly say "Boston." The media guidance application may then go through the process described above in order to generate a correct query.

In some aspects, the media guidance application may receive a first voice query from a user. For example, the media guidance application may hear the user say "When is the Boston team playing?" but misinterpret the query as "When is the Austin team playing?" In some embodiments, the media guidance application may determine a first set of words in the first voice query. For example, the media guidance application may determine that there are six words in the first voice query: "when," "is," "the," "Austin," "team," and "playing." In some embodiments, the media guidance application may determine a first pronunciation time taken by the user for the first voice query. For example, the media guidance application may determine that the user took 3 seconds to pronounce the query. In some embodiments, the media guidance application may calculate a first pronunciation rate of the first voice query based on a first number of words in the first set of words and based on the first pronunciation time. For example, the media guidance application may calculate the first pronunciation rate to be 2 wps. In some embodiments, the media guidance application may receive a second voice query from the user. For example, the media guidance application may hear the user slowly say "No, I meant, Boston." In some embodiments, the media guidance application may determine a second set of words in the second voice query. For example, the media guidance application may determine that there are four words in the second voice query: "No," "I," "meant," and "Boston." In some embodiments, the media guidance application may determine a second pronunciation time taken by the user for the second voice query. For example, the media guidance application may determine that the second pronunciation time is 1 wps.

In some embodiments, the media guidance application may calculate a second pronunciation rate of the second voice query based on a second number of words in the second set of words and based on the second pronunciation time. For example, the media guidance application may calculate the pronunciation rate of the second voice query to be 1 wps. In some embodiments, the media guidance application may determine whether the second pronunciation rate is lower than the first pronunciation rate. For example, the media guidance application may determine that second query has a lower pronunciation rate (1 wps) than the first query (2 wps). In some embodiments, in response to determining that the second pronunciation rate is lower than the first pronunciation rate, the media guidance application may generate a third voice query based on the second set of words and the first pronunciation rate. For example, the media guidance application may generate a third voice query being "No, I meant, Boston" but having a 2 wps pronunciation rate. In some embodiments, the media guidance application may select a first candidate word from the first set of words in the first voice query. For example, the media guidance application may select the word "Austin" from the first voice query.

In some embodiments, the media guidance application may determine a first candidate pronunciation time for the first candidate word in the first voice query. For example, the media guidance application may determine that the first candidate pronunciation time for the word "Austin" is 500 ms. In some embodiments, the media guidance application may select a second candidate word from the second set of words in the third voice query. For example, the media guidance application may select the word "Boston" from the second voice query. In some embodiments, the media guidance application may determine a second candidate pronunciation time for the second candidate word in the third voice query. For example, the media guidance application may determine that second candidate pronunciation time for the word "Boston" is 500 ms. In some embodiments, the media guidance application may determine whether the first candidate pronunciation time matches the second candidate pronunciation time. For example, the media guidance application may determine that the pronunciation times of the word "Austin" and "Boston" match. In some embodiments, in response to determining that the first candidate pronunciation time matches the second candidate pronunciation time, the media guidance application may generate a fourth voice query based on the first set of words and the first pronunciation rate, wherein the first candidate word in the first set of words is replaced with the second candidate word. For example, the media guidance application may generate a fourth query being "When is the Boston team playing?" In some embodiments, the media guidance application may generate for display one or more search results for the first and second voice queries based on the fourth voice query. For example, the media guidance application may display the schedule of the Boston team playing.

In order to determine the first set of words in the first voice query, in some embodiments, the media guidance application may determine a first set of pauses in the first voice query. For example, the media guidance application may determine that there are seven pauses, including one before the first "When" and one after "playing." In some embodiments, the media guidance application may select two consecutive pauses from the first set of pauses. For example, the media guidance application may select the fourth and fifth pause from the first set of pauses. In some embodiments, the media guidance application may determine a first word in the first set of words, wherein the first word is located between the two consecutive pauses from the first set of pauses. For example, the media guidance application may determine "Austin" as a word in the query because it is located between the fourth and fifth pauses.

In order to calculate the first pronunciation rate of the first voice query based on the first number of words in the first set of words and based on the first pronunciation time, in some embodiments, the media guidance application may determine a number of pauses in the first set of pauses. For example, the media guidance application may determine that there are seven pauses in the first set of pauses. In some embodiments, the media guidance application may determine the first number of words as one less than the number of pauses in the first set of pauses. For example, the media guidance application may determine that there are seven pauses in the first set of pauses and thus six words in the first set of words. In some embodiments, the media guidance application may calculate the first pronunciation rate based on the first pronunciation time and the first number of words. For example, the media guidance application may determine that the first pronunciation rate is 2 wps because there are six words in the first set of words and the first pronunciation time of the first voice query is 3 seconds.

In order to determine the first candidate pronunciation time for the first candidate word, in some embodiments, the media guidance application may determine a first pause from the first set of pauses, wherein the first pause is located before the first candidate word. For example, the media guidance application may determine that the fourth pause is before the word "Austin." In some embodiments, the media guidance application may determine a second pause from the first set of pauses, wherein the second pause is located after the first candidate word. For example, the media guidance application may determine that the fifth pause is located after the word "Austin." In some embodiments, the media guidance application may determine a first time that corresponds to an end of the first pause. For example, the media guidance application may determine that the fourth pause is over at 1.5 seconds. In some embodiments, the media guidance application may determine a second time that corresponds to a beginning of the second pause. For example, the media guidance application may determine that the fifth pause starts at 2 seconds. In some embodiments, the media guidance application may determine the first candidate pronunciation time as a difference between the first time and the second time. For example, the media guidance application may determine that the word "Austin" has the first pronunciation time of 500 ms (2 seconds minus 1.5 seconds).

In some embodiments, in response to determining that the first candidate pronunciation time does not match the second candidate pronunciation time, the media guidance application may select a third candidate word from the first set of words in the first voice query. For example, the media guidance application may select the word "Austin," instead of the initial selected word "playing," from the first voice query. In some embodiments, the media guidance application may determine a third candidate pronunciation time for the third candidate word in the first voice query. For example, the media guidance application may determine that the third candidate pronunciation time is 500 ms for the third candidate word "Austin." In some embodiments, the media guidance application may determine whether the third candidate pronunciation time matches the second candidate pronunciation time. For example, the media guidance application may determine that since the word "Boston" has a 500 ms second candidate pronunciation time, it matches the third candidate word "Austin."

In some embodiments, in response to determining that the third candidate pronunciation time matches the second candidate pronunciation time, the media guidance application may generate a fourth voice query based on the first set of words and the first pronunciation rate, wherein the third candidate word in the first set of words is replaced with the second candidate word. For example, the media guidance application may generate a fourth query being "When is the Boston team playing?" In some embodiments, the media guidance application may generate for display one or more search results for the first and second voice queries based on the fourth voice query. For example, the media guidance application may generate for display schedules of the Boston team playing.

Alternatively, in some embodiments, in response to determining that the first candidate pronunciation time does not match the second candidate pronunciation time, the media guidance application may select a third candidate word from the second set of words in the third voice query. For example, the media guidance application may select the word "Boston," after initially selecting the word "meant." In some embodiments, the media guidance application may determine a third candidate pronunciation time for the third candidate word in the third voice query. In some embodiments, the media guidance application may determine whether the first candidate pronunciation time matches the third candidate pronunciation time. In some embodiments, in response to determining that the first candidate pronunciation time matches the third candidate pronunciation time, the media guidance application may generate a fourth voice query based on the first set of words and the first pronunciation rate, wherein the first candidate word in the first set of words is replaced with the third candidate word. In some embodiments, the media guidance application may generate for display one or more search results for the first and second voice queries based on the fourth voice query.

Alternatively, in some embodiments, in response to determining that the first candidate pronunciation time does not match the second candidate pronunciation time, the media guidance application may select a third candidate word from the first set of words in the first voice query. In some embodiments, the media guidance application may determine a third candidate pronunciation time for the third candidate word in the first voice query. In some embodiments, the media guidance application may select a fourth candidate word from the second set of words in the third voice query. In some embodiments, the media guidance application may determine a fourth candidate pronunciation time for the fourth candidate word in the third voice query. In some embodiments, the media guidance application may determine whether the third candidate pronunciation time matches the fourth candidate pronunciation time. In some embodiments, in response to determining that the third candidate pronunciation time matches the fourth candidate pronunciation time, the media guidance application may generate a fourth voice query based on the first set of words and the first pronunciation rate, wherein the third candidate word in the first set of words is replaced with the fourth candidate word. In some embodiments, the media guidance application may generate for display one or more search results for the first and second voice queries based on the fourth voice query.

In order to determine whether the first candidate pronunciation time matches the second candidate pronunciation time, in some embodiments, the media guidance application may receive a threshold deviation time. For example, the media guidance application may receive a 5 ms threshold deviation time. In some embodiments, the media guidance application may determine a time difference between the first candidate pronunciation time and the second candidate pronunciation time. For example, the media guidance application may determine that the word "Austin" has a pronunciation time of 500 ms and the word "Boston" has a pronunciation time of 503 ms, thus the time difference would be 3 ms. In some embodiments, the media guidance application may determine whether the time difference between the first candidate pronunciation time and the second candidate pronunciation time is less than the threshold deviation time. For example, the media guidance application may determine that the 3 ms time difference is less than the 5 ms threshold deviation time. In some embodiments, in response to determining that the time difference is less than the threshold deviation time, the media guidance application may determine that the first candidate pronunciation time matches the second candidate pronunciation time.

While generating for display one or more search results for the first and second voice queries based on the fourth voice query, in some embodiments, the media guidance application may generate for display the fourth voice query. For example, the media guidance application may display to the user the corrected query "When is the Boston team playing?" for the user to confirm that the query is a correct one. In some embodiments, the media guidance application may present the user with a first selectable option to indicate that the fourth voice query is correct and a second selectable option to indicate that the fourth voice query is incorrect. For example, the media guidance application may display a selectable option to confirm that the fourth voice query is correct and a selectable option to state that the fourth voice query is wrong. In some embodiments, the media guidance application may receive a user selection of the first selectable option to indicate that the fourth voice query is correct. For example, the media guidance application may receive the indication that the user selected the selectable option to confirm that the fourth voice query is correct. In some embodiments, the media guidance application may, in response to receiving the user selection of the first selectable option, generate for display one or more search results for the first and second voice queries based on the fourth voice query.

In some embodiments, the media guidance application may receive a user selection of the second selectable option to indicate that the fourth voice query is incorrect. For example, the media guidance application may receive the indication that the user selected the selectable option to state that the fourth voice query is wrong. In some embodiments, the media guidance application may, in response to receiving the user selection of the second selectable option, request the user to input another voice query. For example, the media guidance application may display a message prompting the user for a repeated query. In some embodiments, the media guidance application may receive a fifth voice query from the user. For example, the media guidance application may receive the fifth voice query of the user slowly saying "Boston." In some embodiments, the media guidance application may determine a fifth set of words in the fifth voice query.

In some embodiments, the media guidance application may determine a fifth pronunciation time taken by the user for the fifth voice query. In some embodiments, the media guidance application may calculate a fifth pronunciation rate of the fifth voice query based on a fifth number of words in the fifth set of words and based on the fifth pronunciation time. In some embodiments, the media guidance application may determine whether the fifth pronunciation rate is lower than the first pronunciation rate. In some embodiments, the media guidance application may, in response to determining that the fifth pronunciation rate is lower than the first pronunciation rate, generate a sixth voice query based on the fifth set of words and the first pronunciation rate.

In some embodiments, the media guidance application may select a third candidate word from the first set of words in the first voice query. In some embodiments, the media guidance application may determine a third candidate pronunciation time for the third candidate word in the first voice query. In some embodiments, the media guidance application may select a fourth candidate word from the fourth set of words in the sixth voice query. In some embodiments, the media guidance application may determine a fourth candidate pronunciation time for the fourth candidate word in the sixth voice query. In some embodiments, the media guidance application may determine whether the third candidate pronunciation time matches the fourth candidate pronunciation time. In some embodiments, the media guidance application may, in response to determining that the third candidate pronunciation time matches the fourth candidate pronunciation time, generate a seventh voice query based on the first set of words and the first pronunciation rate, wherein the third candidate word in the first set of words is replaced with the fourth candidate word. In some embodiments, the media guidance application may generate for display one or more search results for the first and fifth voice queries based on the sixth voice query.

Often a user attempts to use a voice query to request a media guidance application to perform a search or another suitable action. Sometimes, the media guidance application may misinterpret that voice query and search for something different. In conventional systems, the user has to repeat the whole query again in order to correct the initial voice query. This can be frustrating and time consuming for the user. For example, the user may ask the media guidance application to search for the schedule of a Boston team by pronouncing the voice query "When is the Boston team playing?" The media guidance application may misinterpret the query as "When is the Austin team playing?" and search for the wrong team's schedule. The user will have to repeat the initial voice query "When is the Boston team playing?" in order to obtain the needed schedule, making the user's experience frustrating and time consuming.

The conventional approach to this problem is for the user to repeat the initial query in order to correct the query. The systems and methods described herein provide a solution that allows the user to correct the initial query by simply repeating the misinterpreted word. This solution may be achieved by a media guidance application that calculates a first pronunciation rate of a first voice query from a user, calculates a second pronunciation rate of a second voice query from the user, and determines whether the second pronunciation rate is lower than the first pronunciation rate. In response to determining that the second pronunciation rate is lower than the first pronunciation rate, the media guidance application selects a first candidate word from the first voice query; determines a first candidate pronunciation time for the first candidate word; selects a second candidate word in the second voice query; determines a second candidate pronunciation time for the second candidate word, wherein the second candidate pronunciation time is adjusted from the second pronunciation rate to the first pronunciation rate; determines whether the first candidate pronunciation time matches the second candidate pronunciation time; and, in response to determining that the first candidate pronunciation time matches the second candidate pronunciation time, generates a third voice query based on the first voice query, wherein the first candidate word in the first voice query is replaced with the second candidate word.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for correcting a voice query based on a subsequent voice query with a lower pronunciation rate. As used herein, the term "pronunciation rate" is defined to mean a rate at which the user is pronouncing the words in a query. An example of a pronunciation rate is words per second. For example, the user can ask the media guidance application "When is the Boston team playing?" The query might be misinterpreted as "When is the Austin team playing?" and the user might try to correct the initial query by slowly saying "No, I meant Boston." The media guidance application will then identify "Austin" as the word that the user is trying to correct, because the pronunciation time of the word "Boston" is closest to the pronunciation time of the word "Austin." Pronunciation time may be referred to as spell time. The media guidance application will also take into account the relative speed with which the user is pronouncing the sentence to estimate the pronunciation time. For example, the media guidance application will take into account that the user pronounces "No, I meant Boston" at a lower rate.

Figure 1:
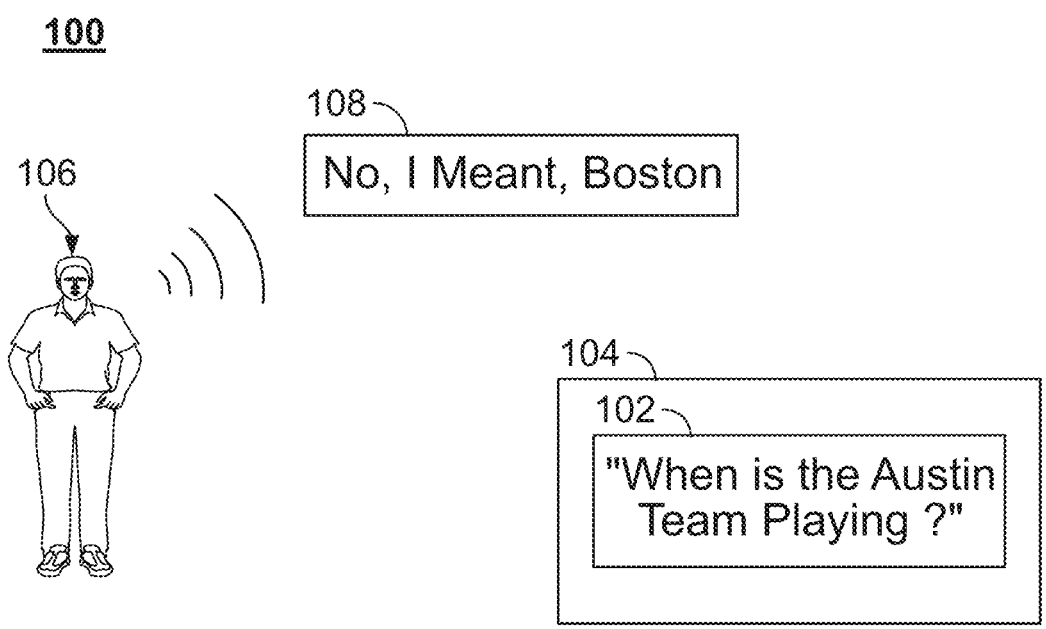
FIG. 1 shows an illustrative example of an interactive media guidance application receiving a subsequent voice query to correct the initial voice query, in accordance with some embodiments of the disclosure.

FIG. 1 shows an illustrative example of an interactive media guidance application receiving a subsequent voice query to correct the initial voice query, in accordance with some embodiments of the disclosure. As depicted FIG. 1 includes first voice query 102, overlay 104, user 106, and second voice query 108. The media guidance application may display first voice query 102 on the displayed overlay 104. The media guidance application may then receive second voice query 108 from user 106 who realized that first voice query 102 is incorrect.

In some aspects, the media guidance application may receive a voice query from the user. For example, the media guidance application may hear the user say "When is the Boston team playing?" but misinterpret the query as "When is the Austin team playing?" The media guidance application may determine the set of words in the query. For example, the media guidance application may determine that there are six words in the query: "when," "is," "the," "Austin," "team," and "playing." The media guidance application may determine the pronunciation time for the query. For example, the media guidance application may determine that the user took 3 seconds to pronounce the query. The media guidance application may calculate the pronunciation rate of the voice query. For example, the media guidance application may calculate the pronunciation rate to be 2 words per second (wps). The media guidance application may receive a new voice query from the user. For example, the media guidance application may hear the user slowly say "No, I meant Boston." The media guidance application may calculate the pronunciation rate of the new voice query. For example, the media guidance application may calculate the new pronunciation rate to be 1 wps. The media guidance application may conclude that because the new pronunciation rate is lower than the initial voice query, the user is trying to correct the initial voice query with the new voice query.

The media guidance application may generate an adjusted voice query, which is the repeated voice query but at the first pronunciation rate. For example, the media guidance application may generate the adjusted voice query as being "No, I meant Boston" but played twice as fast as the original new query, so that the pronunciation rate of the adjusted voice query is 1 wps. The media guidance application may compare the pronunciation time of a word from the initial voice query and a word from the adjusted voice query to determine if the pronunciation times match. For example, the media guidance application may select the word "Austin" from the initial voice query, and the word "Boston" from the adjusted voice query and determine that their pronunciation times match. Further, the media guidance application may generate a corrected voice query that is the initial voice query with the word from the adjusted voice query that matches the pronunciation time of the word in the initial voice query. For example, the media guidance application may generate a corrected voice query being "When is the Boston team playing?" The media guidance application may generate for display the results of the corrected voice query. For example, the media guidance application may display the schedule of the Boston team playing.

In some embodiments, the media guidance application may correct the initial query using a set of stored templates. The media guidance application may replace words in the initial query with words from the new query by computing a score based on grammar templates stored in the local or remote storage. The media guidance application may weigh the templates based on the usage frequency of the templates.

In order to determine the words in a query, in some embodiments, the media guidance application may determine a set of pauses in the query. For example, the media guidance application may determine that there are seven pauses, including one before the first "When" and one after "playing." Further, the media guidance application may select two consecutive pauses. For example, the media guidance application may select the fourth and fifth pause from the seven pauses identified above. The media guidance application may then determine a word that is located between the two consecutive pauses. For example, the media guidance application may determine "Austin" as a word in the query.

In order to determine the pronunciation rate of a query, in some embodiments, the media guidance application may determine the number of pauses in the query. For example, the media guidance application may determine that there are seven pauses in the query. The media guidance application may determine the number as one less than the number of pauses. For example, the media guidance application may determine that there are seven pauses and thus six words in the query. The media guidance application may calculate the pronunciation rate of the query based on the number of words and the pronunciation time of the query. For example, the media guidance application may determine that the pronunciation rate is 2 wps because there are six words and the pronunciation time of the query is 3 seconds.

In order to determine a pronunciation time of a word in a query, in some embodiments, the media guidance application may determine a pause that is located immediately before the word and determine the time at which that pause is over. For example, the media guidance application may determine that the fourth pause, the pause before the word "Austin," is over at 1.5 seconds. The media guidance application may determine a pause that is located immediately after the word and determine the time at which that pause starts. For example, the media guidance application may determine that the fifth pause, the pause after the word "Austin," starts at 2 seconds. The media guidance application may determine the pronunciation time of a word as the difference between time of the start of the pause after the word and the time of the end of the pause before the word. For example, the media guidance application may determine that the word "Austin" has a pronunciation time of 0.5 seconds (2 seconds minus 1.5 seconds).

In the case when the pronunciation times of the word from the initial query and adjusted query do not match, in some embodiments, the media guidance application may pick a new word from the initial query. For example, the media guidance application may determine that the pronunciation time of the word "When," from the initial query and the word "meant" from the adjusted query do not match and pick the word "Austin," from the initial query to compare to the word "meant." Alternatively, the media guidance application may pick a new word from the adjusted query. For example, the media guidance application may pick the word "Boston," from the adjusted query, to compare to the word "When," from the initial query. Alternatively, the media guidance application may pick a new word from the initial query and a new word from the adjusted query. For example, the media guidance application may pick the word "Austin," from the initial query and the word "Boston," from the adjusted query.

In order to determine whether the pronunciation times of the word from the initial query and adjusted query match, in some embodiments, the media guidance application may receive a threshold deviation time. As defined herein, the term "threshold deviation time" is defined to mean a maximum pronunciation time difference between the words, which will still result in the media guidance application determining that the pronunciation times of the two words match. For example, the media guidance application may receive a 5 milliseconds (ms) threshold deviation time. The media guidance application may determine the difference between the pronunciation times of the two words. For example, the media guidance application may determine that the word "Austin" has a pronunciation time of 500 ms and the word "Boston" has a pronunciation time of 503 ms. The media guidance application may determine that the words match if the time difference between the pronunciation times is smaller than the threshold deviation time. For example, the media guidance application may determine that the word "Austin" and "Boston" match, since the difference in their pronunciation times is only 3 ms, which is smaller than the 5 ms corresponding to the threshold deviation time.

In some embodiments, the media guidance application may display the corrected query to the user and allow the user to confirm that the query is correct. For example, the media guidance application may display to the user the corrected query "When is the Boston team playing?" for the user to confirm that the query is a correct one. The media guidance application may, after the user has confirmed that the corrected query is correct, display search results corresponding to the corrected query. For example, the media guidance application may display schedules for the Boston team.

In some embodiments, the media guidance application may receive an input from the user indicating that the corrected query is wrong. For example, the user may receive a corrected query saying "When is the Austin team playing?" and indicate that the query is wrong. The media guidance application may then receive another query from the user trying to correct the initial query. For example, the user can slowly say "Boston." The media guidance application may then go through the process described above in order to generate a correct query.

In some aspects, the media guidance application may receive a first voice query 102 from a user. For example, the media guidance application may hear the user say "When is the Boston team playing?" but misinterpret the query as "When is the Austin team playing?" The media guidance application may store the first voice query 102 in storage 408. The media guidance application may receive the first voice query 102 through user input interface 410. The media guidance application may display the first voice query 102 on display 412. In some embodiments, the media guidance application may determine a first set of words in the first voice query 102. For example, the media guidance application may determine that there are six words in the first voice query 102: "when," "is," "the," "Austin," "team," and "playing." In some embodiments, the media guidance application may determine a first pronunciation time taken by the user for the first voice query 102. For example, the media guidance application may determine that the user took 3 seconds to pronounce the query.

In some embodiments, the media guidance application may calculate a first pronunciation rate of the first voice query 102 based on a first number of words in the first set of words and based on the first pronunciation time. For example, the media guidance application may calculate the first pronunciation rate to be 2 wps. In some embodiments, the media guidance application may receive a second voice query 108 from the user. For example, the media guidance application may hear the user slowly say "No, I meant Boston." In some embodiments, the media guidance application may determine a second set of words in the second voice query 108. For example, the media guidance application may determine that there are four words in the second voice query 108: "No," "I," "meant," and "Boston." In some embodiments, the media guidance application may determine a second pronunciation time taken by the user for the second voice query 108. For example, the media guidance application may determine that the second pronunciation time is 1 wps.

In some embodiments, the media guidance application may calculate a second pronunciation rate of the second voice query 108 based on a second number of words in the second set of words and based on the second pronunciation time. For example, the media guidance application may calculate the pronunciation rate of the second voice query 108 to be 1 wps. In some embodiments, the media guidance application may determine whether the second pronunciation rate is lower than the first pronunciation rate. For example, the media guidance application may determine that second query is has a lower pronunciation rate (1 wps) than the first query (2 wps). In some embodiments, in response to determining that the second pronunciation rate is lower than the first pronunciation rate, the media guidance application may generate a third voice query based on the second set of words and the first pronunciation rate. For example, the media guidance application may generate a third voice query being "No, I meant Boston" but having a 2 wps pronunciation rate. In some embodiments, the media guidance application may select a first candidate word from the first set of words in the first voice query 102. The media guidance application may select the first candidate word at random, in the order of appearance of the words, in the reverse order of appearance of the words, and the like. For example, the media guidance application may select the word "Austin" from the first voice query 102.

In some embodiments, the media guidance application may determine a first candidate pronunciation time for the first candidate word in the first voice query 102. For example, the media guidance application may determine that the first candidate pronunciation time for the word "Austin" is 500 ms. In some embodiments, the media guidance application may select a second candidate word from the second set of words in the third voice query. For example, the media guidance application may select the word "Boston" from the second voice query 108. In some embodiments, the media guidance application may determine a second candidate pronunciation time for the second candidate word in the third voice query. For example, the media guidance application may determine that second candidate pronunciation time for the word "Boston" is 500 ms.

In some embodiments, the media guidance application may determine whether the first candidate pronunciation time matches the second candidate pronunciation time. For example, the media guidance application may determine that the pronunciation times of the word "Austin" and "Boston" match. In some embodiments, in response to determining that the first candidate pronunciation time matches the second candidate pronunciation time, the media guidance application may generate a fourth voice query based on the first set of words and the first pronunciation rate, wherein the first candidate word in the first set of words is replaced with the second candidate word. For example, the media guidance application may generate a fourth query being "When is the Boston team playing?" In some embodiments, the media guidance application may generate for display one or more search results for the first and second voice queries based on the fourth voice query. The media guidance application may use display 412 to generate the search results for the first and second voice queries based on the fourth voice query. For example, the media guidance application may display the schedule of the Boston team playing.

In order to determine the first set of words in the first voice query 102, in some embodiments, the media guidance application may determine a first set of pauses in the first voice query 102. The media guidance application may use the level of the sound to determine the pause. The media guidance application may receive a threshold level of sound from a remote or local database. If the level of sound is lower than the threshold level, the media guidance application may determine a pause. For example, the media guidance application may determine that there are seven pauses, including one before the first "When" and one after "playing." In some embodiments, the media guidance application may select two consecutive pauses from the first set of pauses. The media guidance application may store the pauses in storage 408. For example, the media guidance application may select the fourth and fifth pause from the first set of pauses. In some embodiments, the media guidance application may determine a first word in the first set of words, wherein the first word is located between the two consecutive pauses from the first set of pauses. For example, the media guidance application may determine "Austin" as a word in the query because it is located between the fourth and fifth pauses.

In order to calculate the first pronunciation rate of the first voice query 102 based on the first number of words in the first set of words and based on the first pronunciation time, in some embodiments, the media guidance application may determine a number of pauses in the first set of pauses. For example, the media guidance application may determine that there are seven pauses in the first set of pauses. In some embodiments, the media guidance application may determine the first number of words as one less than the number of pauses in the first set of pauses. For example, the media guidance application may determine that there are seven pauses in the first set of pauses and thus six words in the first set of words. In some embodiments, the media guidance application may calculate the first pronunciation rate based on the first pronunciation time and the first number of words. For example, the media guidance application may determine that the first pronunciation rate is 2 wps because there are six words in the first set of words and the first pronunciation time of the first voice query 102 is 3 seconds.

In order to determine the first candidate pronunciation time for the first candidate word, in some embodiments, the media guidance application may determine a first pause from the first set of pauses, wherein the first pause is located before the first candidate word. For example, the media guidance application may determine that the fourth pause is before the word "Austin." In some embodiments, the media guidance application may determine a second pause from the first set of pauses, wherein the second pause is located after the first candidate word. For example, the media guidance application may determine that the fifth pause is located after the word "Austin." In some embodiments, the media guidance application may determine a first time that corresponds to an end of the first pause. For example, the media guidance application may determine that the fourth pause is over at 1.5 seconds. In some embodiments, the media guidance application may determine a second time that corresponds to a beginning of the second pause. For example, the media guidance application may determine that the fifth pause starts at 2 seconds. In some embodiments, the media guidance application may determine the first candidate pronunciation time as a difference between the first time and the second time. For example, the media guidance application may determine that the word "Austin" has the first pronunciation time of 500 ms (2 seconds minus 1.5 seconds).

In some embodiments, in response to determining that the first candidate pronunciation time does not match the second candidate pronunciation time, the media guidance application may select a third candidate word from the first set of words in the first voice query 102. For example, the media guidance application may select the word "Austin," instead of the initial selected word "playing," from the first voice query 102. In some embodiments, the media guidance application may determine a third candidate pronunciation time for the third candidate word in the first voice query 102. For example, the media guidance application may determine that the third candidate pronunciation time is 500 ms for the third candidate word "Austin." In some embodiments, the media guidance application may determine whether the third candidate pronunciation time matches the second candidate pronunciation time. For example, the media guidance application may determine that since the word "Boston" has a 500 ms second candidate pronunciation time, it matches the third candidate word "Austin." In some embodiments, in response to determining that the third candidate pronunciation time matches the second candidate pronunciation time, the media guidance application may generate a fourth voice query based on the first set of words and the first pronunciation rate, wherein the third candidate word in the first set of words is replaced with the second candidate word. For example, the media guidance application may generate a fourth query being "When is the Boston team playing?" In some embodiments, the media guidance application may generate for display one or more search results for the first and second voice queries based on the fourth voice query. For example, the media guidance application may generate for display schedules of the Boston team playing.

Alternatively, in some embodiments, in response to determining that the first candidate pronunciation time does not match the second candidate pronunciation time, the media guidance application may select a third candidate word from the second set of words in the third voice query. For example, the media guidance application may select the word "Boston," after initially selecting the word "meant." In some embodiments, the media guidance application may determine a third candidate pronunciation time for the third candidate word in the third voice query. In some embodiments, the media guidance application may determine whether the first candidate pronunciation time matches the third candidate pronunciation time. In some embodiments, in response to determining that the first candidate pronunciation time matches the third candidate pronunciation time, the media guidance application may generate a fourth voice query based on the first set of words and the first pronunciation rate, wherein the first candidate word in the first set of words is replaced with the third candidate word. In some embodiments, the media guidance application may generate for display one or more search results for the first and second voice queries based on the fourth voice query.

Alternatively, in some embodiments, in response to determining that the first candidate pronunciation time does not match the second candidate pronunciation time, the media guidance application may select a third candidate word from the first set of words in the first voice query 102. In some embodiments, the media guidance application may determine a third candidate pronunciation time for the third candidate word in the first voice query 102. In some embodiments, the media guidance application may select a fourth candidate word from the second set of words in the third voice query. In some embodiments, the media guidance application may determine a fourth candidate pronunciation time for the fourth candidate word in the third voice query. In some embodiments, the media guidance application may determine whether the third candidate pronunciation time matches the fourth candidate pronunciation time. In some embodiments, in response to determining that the third candidate pronunciation time matches the fourth candidate pronunciation time, the media guidance application may generate a fourth voice query based on the first set of words and the first pronunciation rate, wherein the third candidate word in the first set of words is replaced with the fourth candidate word. In some embodiments, the media guidance application may generate for display one or more search results for the first and second voice queries based on the fourth voice query.

In order to determine whether the first candidate pronunciation time matches the second candidate pronunciation time, in some embodiments, the media guidance application may receive a threshold deviation time. The media guidance application may receive the threshold deviation time from storage 408, media content source 516, or media guidance data source 518. For example, the media guidance application may receive a 5 ms threshold deviation time. In some embodiments, the media guidance application may determine a time difference between the first candidate pronunciation time and the second candidate pronunciation time. For example, the media guidance application may determine that the word "Austin" has a pronunciation time of 500 ms and the word "Boston" has a pronunciation time of 503 ms thus the time difference would be 3 ms. In some embodiments, the media guidance application may determine whether the time difference between the first candidate pronunciation time and the second candidate pronunciation time is less than the threshold deviation time. For example, the media guidance application may determine that 3 ms time difference is less than the 5 ms threshold deviation time. In some embodiments, in response to determining that the time difference is less than the threshold deviation time, determine that the first candidate pronunciation time matches the second candidate pronunciation time.

While generating for display one or more search results for the first and second voice queries based on the fourth voice query, in some embodiments, the media guidance application may generate for display the fourth voice query. The media guidance application may use display 412 to generate for display the fourth voice query. For example, the media guidance application may display to the user the corrected query "When is the Boston team playing?" for the user to confirm that the query is a correct one. In some embodiments, the media guidance application may present the user with a first selectable option to indicate that the fourth voice query is correct and a second selectable option to indicate that the fourth voice query is incorrect. For example, the media guidance application may display a selectable option to confirm that the fourth voice query is connect and a selectable option to state the fourth voice query is wrong. In some embodiments, the media guidance application may receive a user selection of the first selectable option to indicate that the fourth voice query is connect.

The media guidance application may use user input interface 410 to receive the user selection of the first selectable option. For example, the media guidance application may receive the indication that the user selected the selectable option to confirm that the fourth voice query is correct. In some embodiments, the media guidance application may in response to receiving the user selection of the first selectable option, generate for display one or more search results for the first and second voice queries based on the fourth voice query.

In some embodiments, the media guidance application may receive a user selection of the second selectable option to indicate that the fourth voice query is incorrect. The media guidance application may use user input interface 410 to receive the user selection of the second selectable option. For example, the media guidance application may receive the indication that the user selected the selectable option to state that the fourth voice query is wrong. In some embodiments, the media guidance application may in response to receiving the user selection of the second selectable option, request the user to input another voice query. For example, the media guidance application may display a message prompting the user for a repeated query. In some embodiments, the media guidance application may receive a fifth voice query from the user. For example, the media guidance application may receive the fifth voice query of the user slowly saying "Boston." In some embodiments, media guidance application may determine a fifth set of words in the fifth voice query.

In some embodiments, the media guidance application may determine a fifth pronunciation time taken by the user for the fifth voice query. In some embodiments, the media guidance application may calculate a fifth pronunciation rate of the fifth voice query based on a fifth number of words in the fifth set of words and based on the fifth pronunciation time. In some embodiments, the media guidance application may determine whether the fifth pronunciation rate is lower than the first pronunciation rate. In some embodiments, the media guidance application may, in response to determining that the fifth pronunciation rate is lower than the first pronunciation rate, generate a sixth voice query based on the fifth set of words and the first pronunciation rate. In some embodiments, the media guidance application may select a third candidate word from the first set of words in the first voice query 102. In some embodiments, the media guidance application may determine a third candidate pronunciation time for the third candidate word in the first voice query 102. In some embodiments, the media guidance application may select a fourth candidate word from the fourth set of words in the sixth voice query. In some embodiments, the media guidance application may determine a fourth candidate pronunciation time for the fourth candidate word in the sixth voice query.

In some embodiments, the media guidance application may determine whether the third candidate pronunciation time matches the fourth candidate pronunciation time. In some embodiments, the media guidance application may, in response to determining that the third candidate pronunciation time matches the fourth candidate pronunciation time, generate a seventh voice query based on the first set of words and the first pronunciation rate, wherein the third candidate word in the first set of words is replaced with the fourth candidate word. In some embodiments, the media guidance application may generate for display one or more search results for the first and fifth voice queries based on the sixth voice query.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
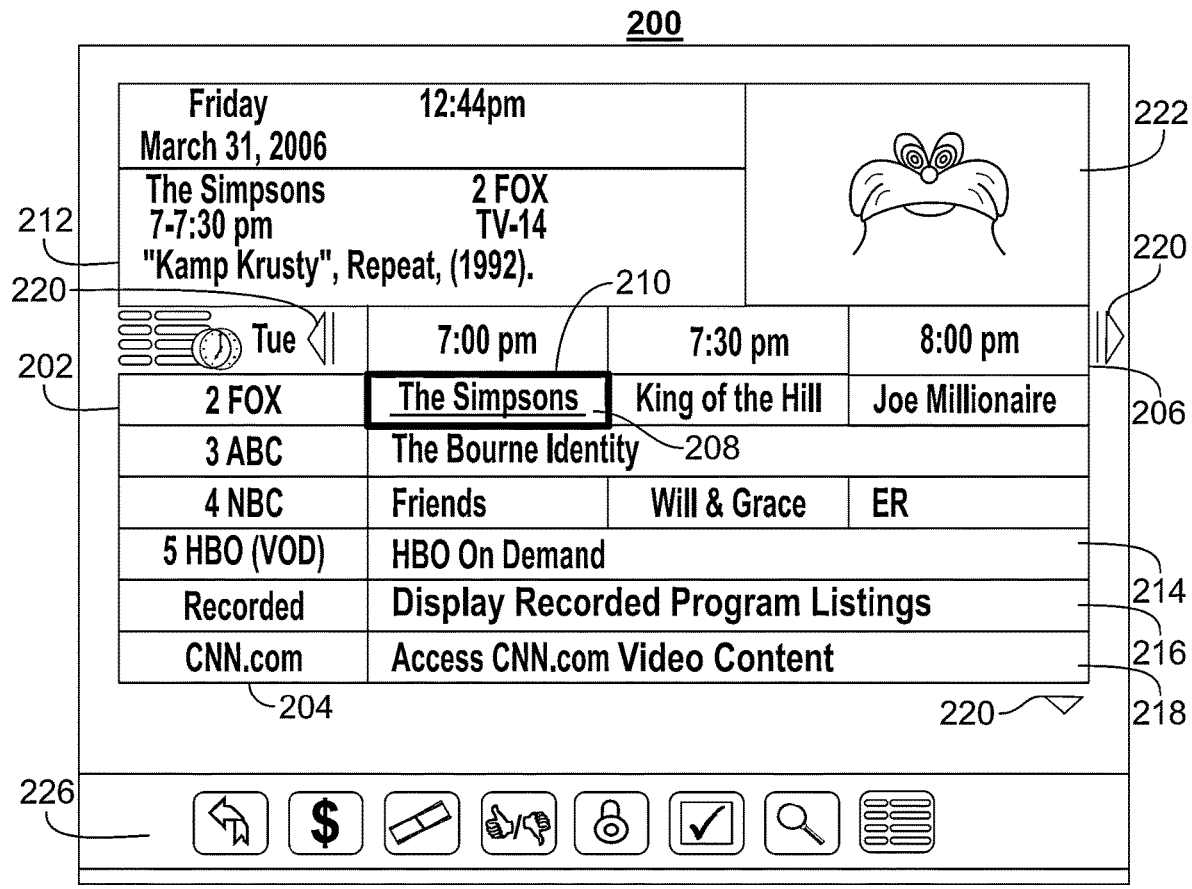
FIG. 2 shows an illustrative embodiment of a display screen that may be used to provide media guidance application listings and other media guidance information, in accordance with some embodiments of the disclosure.
Figure 3:
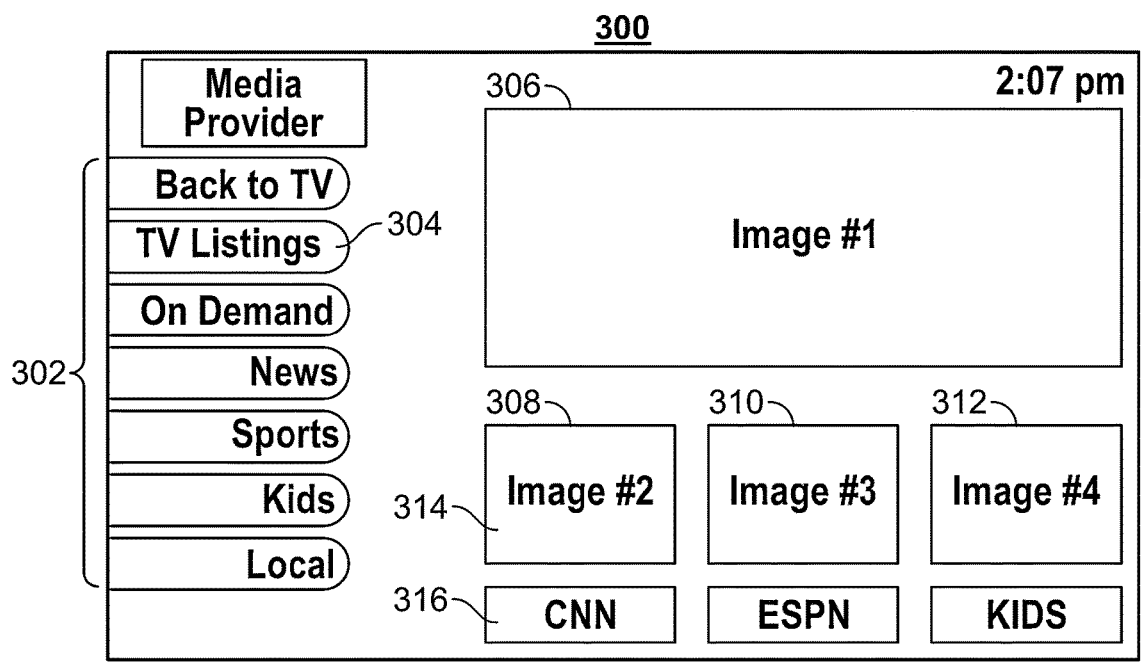
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No.

2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
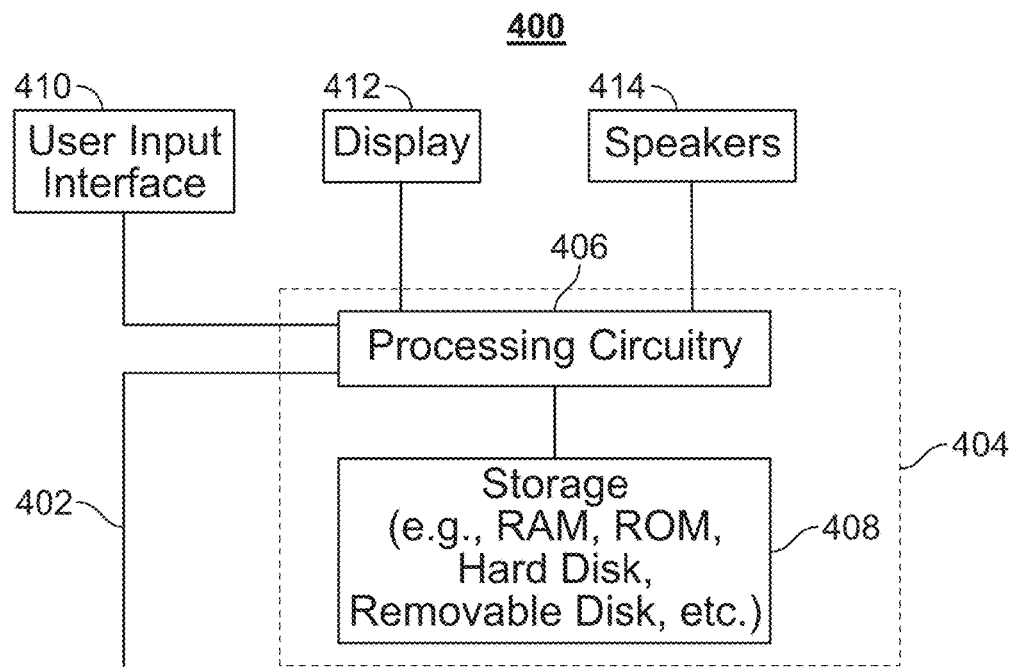
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
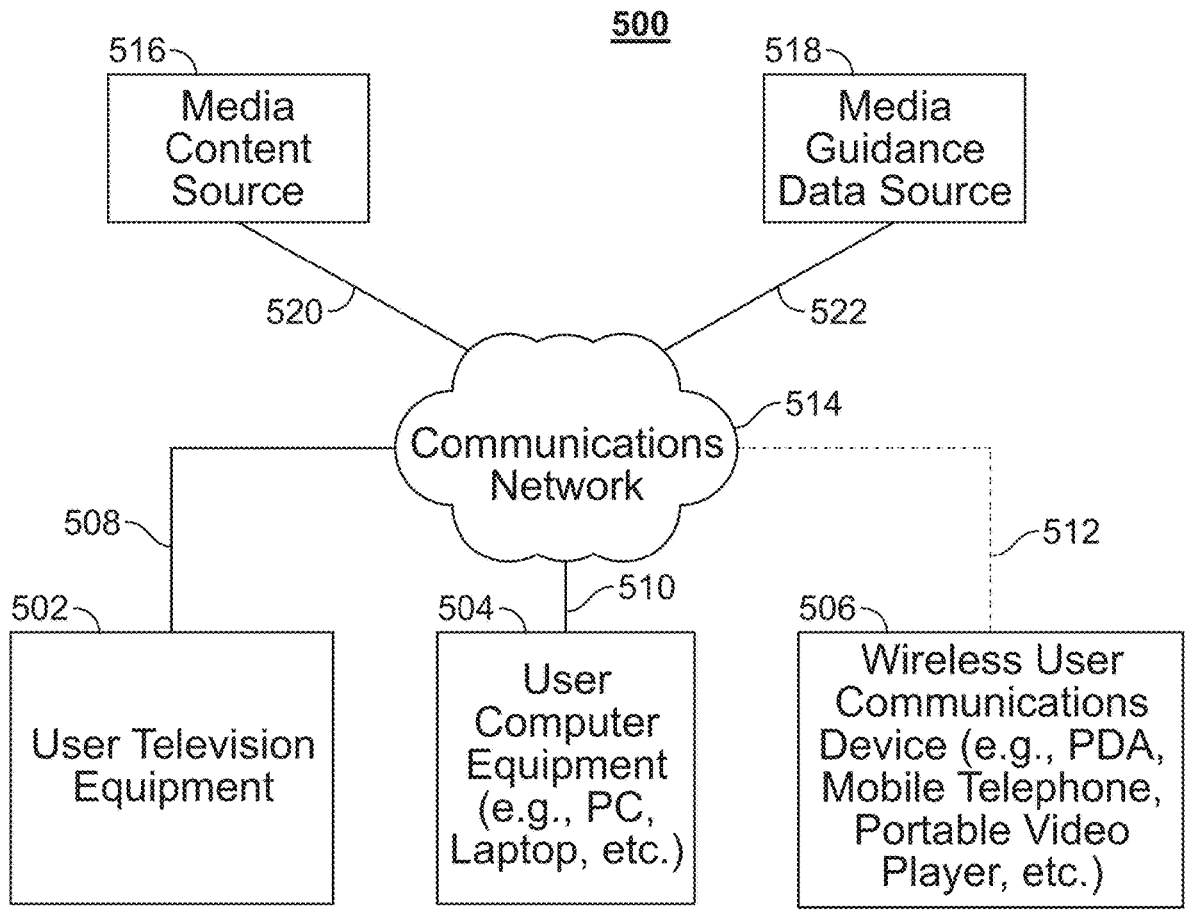
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and a server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having a content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

Figure 6:
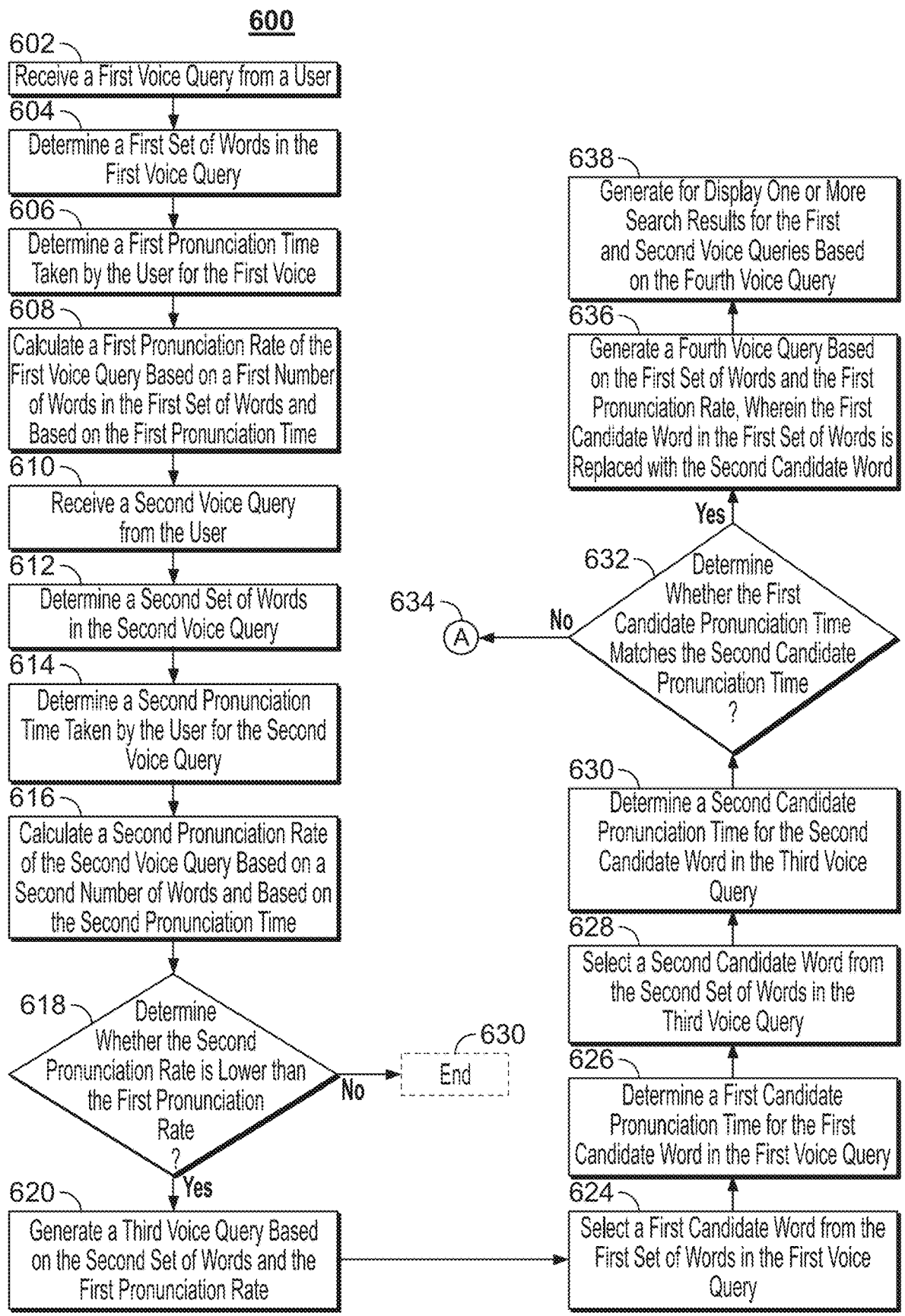
FIG. 6 depicts an illustrative flowchart of a process for correcting a voice query based on a subsequent voice query with a lower pronunciation rate by generating a third voice query, in accordance with some embodiments of the disclosure.

FIG. 6 depicts an illustrative flowchart of a process for correcting a first voice query 102 based on a second voice query 108 with a lower pronunciation rate by generating a third voice query, in accordance with some embodiments of the disclosure. Process 600 may be executed by control circuitry 404 (e.g., in a manner instructed to control circuitry 404 by the media guidance application). Control circuitry 404 may be part of remote server separated from the user by communication network 514.

Process 600 begins at 602, when control circuitry 404 receives a first voice query 102 from a user. The first voice query 102 may be received via user input interface 410. The first voice query 102 may be stored in storage 408.

At step 604, control circuitry 404 determines a first set of words in the first voice query 102.

At step 606, control circuitry 404 determines a first pronunciation time taken by the user for the first voice query 102.

At step 608, control circuitry 404 calculates a first pronunciation rate of the first voice query 102 based on a first number of words in the first set of words and based on the first pronunciation time.

At step 610, control circuitry 404 receives a second voice query 108 from the user. The second voice query 108 may be received via user input interface 410. The second voice query 108 may be stored in storage 408.

At step 612, control circuitry 404 determines a second set of words in the second voice query 108.

At step 614, control circuitry 404 determines a second pronunciation time taken by the user for the second voice query 108.

At step 616, control circuitry 404 calculates a second pronunciation rate of the second voice query 108 based on a second number of words in the second set of words and based on the second pronunciation time.

At step 618, control circuitry 404 determines whether the second pronunciation rate is lower than the first pronunciation rate.

If control circuitry 404 determines that the second pronunciation rate is lower than the first pronunciation rate, process 600 continues to step 620. At step 620, control circuitry 404 generates a third voice query based on the second set of words and the first pronunciation rate.

If control circuitry 404 determines that the second pronunciation rate is not lower than the first pronunciation rate, process 600 continues to optional step 622. At step 622, process 600 ends.

At step 624, control circuitry 404 selects a first candidate word from the first set of words in the first voice query 102.

At step 626, control circuitry 404 determines a first candidate pronunciation time for the first candidate word in the first voice query 102.

At step 628, control circuitry 404 selects a second candidate word from the second set of words in the third voice query.

At step 630, control circuitry 404 determines a second candidate pronunciation time for the second candidate word in the third voice query.

At step 632, control circuitry 404 determines whether the first candidate pronunciation time matches the second candidate pronunciation time.

If at step 632 control circuitry 404 determines that the first candidate pronunciation time does not match the second candidate pronunciation time, process 600 optionally continues to step 702 of process 700, step 802 of process 800, or step 902 of process 900. At step 634, control circuitry 404 optionally continues to step 702 of process 700, step 802 of process 800, or step 902 of process 900.

If at step 632 control circuitry 404 determines that the first candidate pronunciation time matches the second candidate pronunciation time, process 600 continues to step 636. At step 636, control circuitry 404 generates a fourth voice query based on the first set of words and the first pronunciation rate, wherein the first candidate word in the first set of words is replaced with the second candidate word.

At step 638, control circuitry 404 generates for display one or more search results for the first and second voice queries based on the fourth voice query. Control circuitry 404 may use display 412 to generate the search results.

Figure 7:
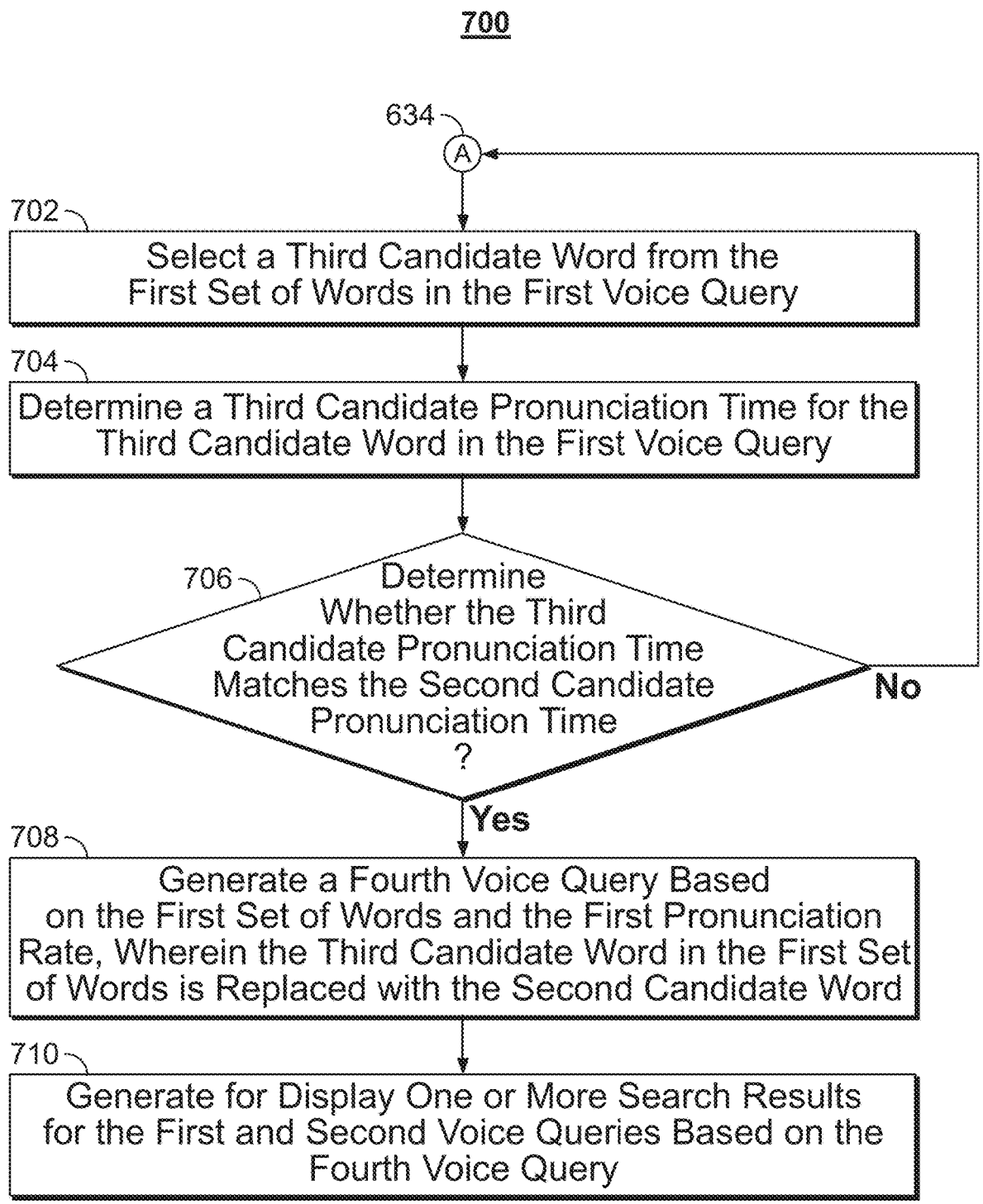
FIG. 7 depicts an illustrative flowchart of a process for, in response to determining that the first candidate pronunciation time does not match the second candidate pronunciation time, selecting and processing a third candidate word from the first voice query, in accordance with some embodiments of the disclosure.

FIG. 7 depicts an illustrative flowchart of a process for, in response to determining that the first candidate pronunciation time does not match the second candidate pronunciation time, selecting and processing a third candidate word from the first voice query 102, in accordance with some embodiments of the disclosure. Process 700 may be executed by control circuitry 404 (e.g., in a manner instructed to control circuitry 404 by the media guidance application). Control circuitry 404 may be part of remote server separated from the user by communication network 514.

Process 700 starts at step 702 when control circuitry 404 selects a third candidate word from the first set of words in the first voice query 102.

At step 704 control circuitry 404 determines a third candidate pronunciation time for the third candidate word in the first voice query 102.

At step 706 control circuitry 404 determines whether the third candidate pronunciation time matches the second candidate pronunciation time.

If at step 706 control circuitry 404 determines that the third candidate pronunciation time does not match the second candidate pronunciation time, process 700 optionally continues to step 702, step 802 of process 800, or step 902 of process 900.

If at step 706 control circuitry 404 determines that the third candidate pronunciation time matches the second candidate pronunciation time, process 700 continues to step 708. At step 708 control circuitry 404 generates a fourth voice query based on the first set of words and the first pronunciation rate, wherein the third candidate word in the first set of words is replaced with the second candidate word.

At step 710 control circuitry 404 generates for display one or more search results for the first and second voice queries based on the fourth voice query. Control circuitry 404 may use display 412 to generate the search results.

Figure 8:
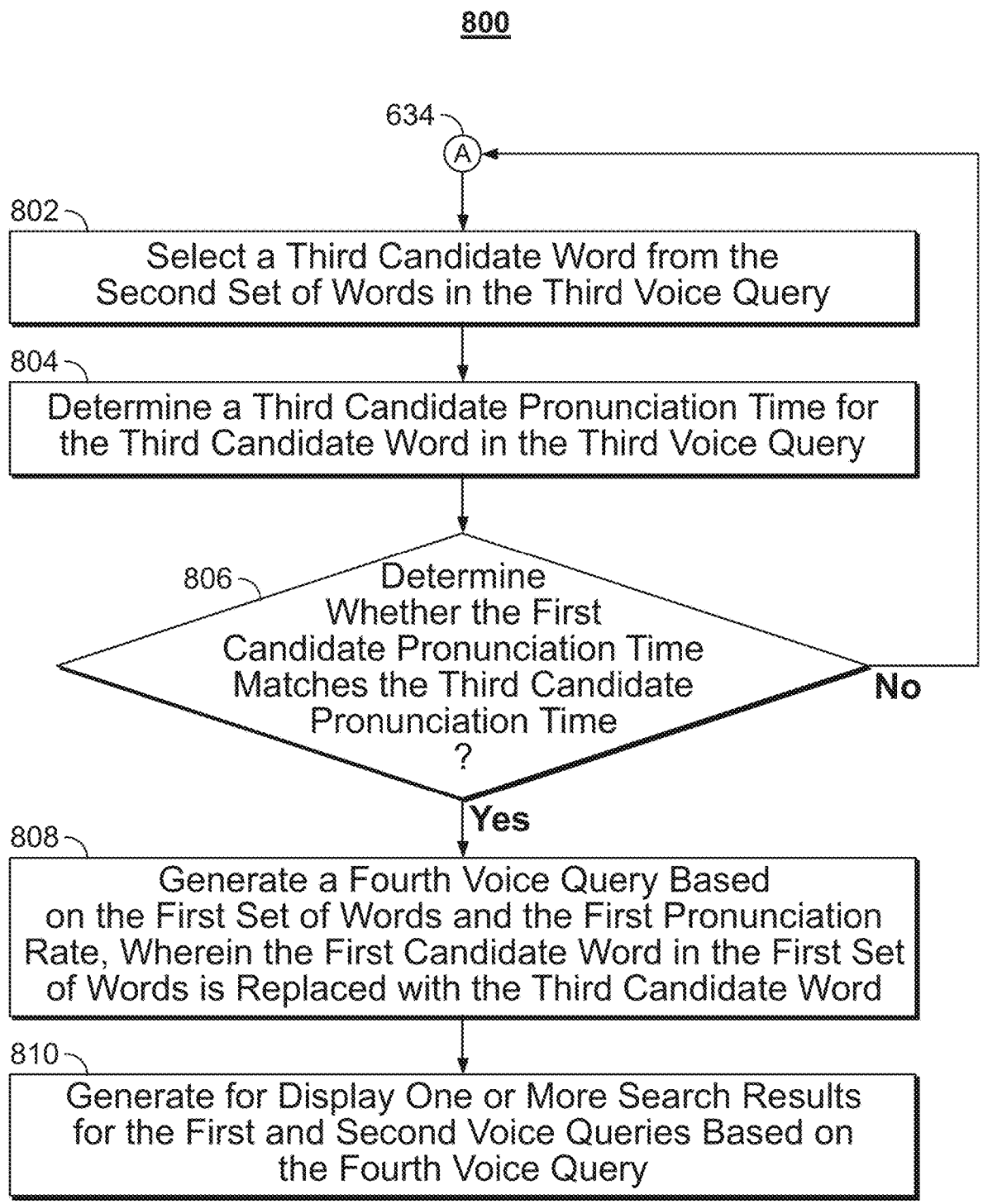
FIG. 8 depicts an illustrative flowchart of a process for, in response to determining that the first candidate pronunciation time does not match the second candidate pronunciation time, selecting and processing a third candidate word from the second voice query, in accordance with some embodiments of the disclosure.

FIG. 8 depicts an illustrative flowchart of a process for, in response to determining that the first candidate pronunciation time does not match the second candidate pronunciation time, selecting and processing a third candidate word from the second voice query 108, in accordance with some embodiments of the disclosure. Process 800 may be executed by control circuitry 404 (e.g., in a manner instructed to control circuitry 404 by the media guidance application). Control circuitry 404 may be part of remote server separated from the user by communication network 514.

Process 800 starts at step 802 when control circuitry 404 selects a third candidate word from the second set of words in the third voice query.

At step 804 control circuitry 404 determines a third candidate pronunciation time for the third candidate word in the third voice query.

At step 806 control circuitry 404 determines whether the first candidate pronunciation time matches the third candidate pronunciation time.

If at step 806 control circuitry 404 determines that the first candidate pronunciation time does not match the third candidate pronunciation time, process 800 optionally continues to step 702 of process 700, step 802, or step 902 of process 900.

If at step 806 control circuitry 404 determines that the first candidate pronunciation time matches the third candidate pronunciation time process 800 continues to step 808. At step 808 control circuitry 404 generates a fourth voice query based on the first set of words and the first pronunciation rate, wherein the first candidate word in the first set of words is replaced with the third candidate word.

At step 810 control circuitry 404 generates for display one or more search results for the first and second voice queries based on the fourth voice query. Control circuitry 404 may use display 412 to generate the search results.

Figure 9:
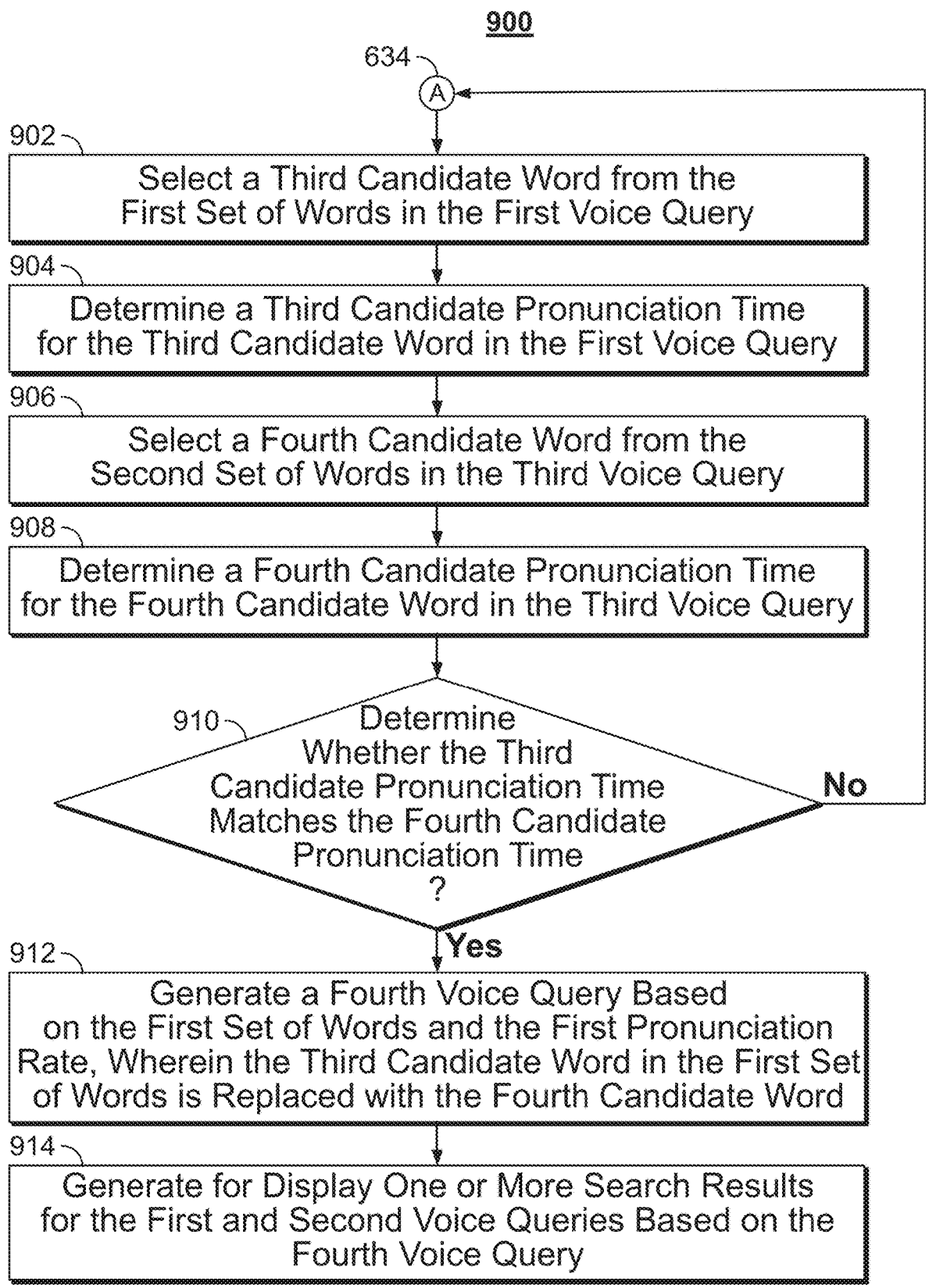
FIG. 9 depicts an illustrative flowchart of a process for, in response to determining that the first candidate pronunciation time does not match the second candidate pronunciation time, selecting and processing a third candidate word from the first voice query and a fourth candidate word from the second voice query, in accordance with some embodiments of the disclosure.

FIG. 9 depicts an illustrative flowchart of a process for, in response to determining that the first candidate pronunciation time does not match the second candidate pronunciation time, selecting and processing a third candidate word from the first voice query 102 and a fourth candidate word from the second voice query 108, in accordance with some embodiments of the disclosure. Process 900 may be executed by control circuitry 404 (e.g., in a manner instructed to control circuitry 404 by the media guidance application). Control circuitry 404 may be part of remote server separated from the user by communication network 514.

Process 900 starts at step 902 when control circuitry 404 selects a third candidate word from the first set of words in the first voice query 102.

At step 904 control circuitry 404 determines a third candidate pronunciation time for the third candidate word in the first voice query 102.

At step 906 control circuitry 404 selects a fourth candidate word from the second set of words in the third voice query.

At step 908 control circuitry 404 determines a fourth candidate pronunciation time for the fourth candidate word in the third voice query.

At step 910 control circuitry 404 determines whether the third candidate pronunciation time matches the fourth candidate pronunciation time.

If at step 910 control circuitry 404 determines that the third candidate pronunciation time does not match the fourth candidate pronunciation time, process 900 optionally continues to step 702 of process 700, step 802 of process 800, or step 902.

If at step 910 control circuitry 404 determines that the third candidate pronunciation time matches the fourth candidate pronunciation time, process 900 continues to step 912. At step 912 control circuitry 404 generates a fourth voice query based on the first set of words and the first pronunciation rate, wherein the third candidate word in the first set of words is replaced with the fourth candidate word.

At step 914 control circuitry 404 generates for display one or more search results for the first and second voice queries based on the fourth voice query. Control circuitry 404 may use display 412 to generate the search results.

Figure 10:
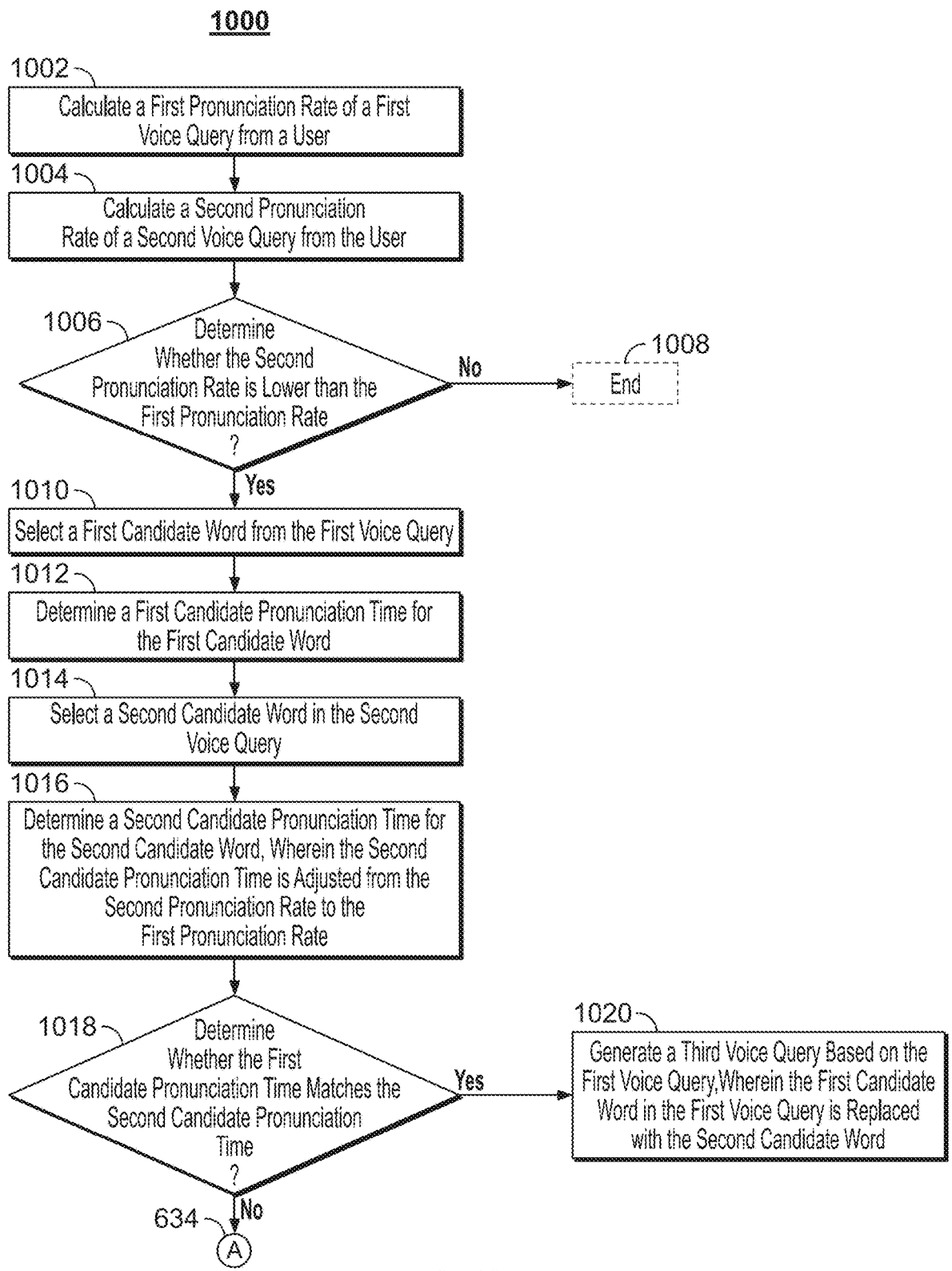
FIG. 10 depicts an illustrative flowchart of a process for correcting a voice query based on a subsequent voice query with a lower pronunciation rate, in accordance with some embodiments of the disclosure.

FIG. 10 depicts an illustrative flowchart of a process for correcting a voice query based on a subsequent voice query with a lower pronunciation rate, in accordance with some embodiments of the disclosure. Process 1000 may be executed by control circuitry 404 (e.g., in a manner instructed to control circuitry 404 by the media guidance application). Control circuitry 404 may be part of remote server separated from the user by communication network 514.

Process 1000 starts at step 1002 when control circuitry 404 calculates a first pronunciation rate of a first voice query 102 from a user.

At step 1004 control circuitry 404 calculates a second pronunciation rate of a second voice query 108 from the user.

At step 1006 control circuitry 404 determines whether the second pronunciation rate is lower than the first pronunciation rate.

If at step 1006 control circuitry 404 determines that the second pronunciation rate is not lower than the first pronunciation rate process 1000 optionally continues to step 1008. At the optional step 1008 control circuitry 404 may end process 1000.

If at step 1006 control circuitry 404 determines that the second pronunciation rate is lower than the first pronunciation rate process 1000 optionally continues to step 1010. At step 1010 control circuitry 404 selects a first candidate word from the first voice query 102.

At step 1012 control circuitry 404 determines a first candidate pronunciation time for the first candidate word.

At step 1014 control circuitry 404 selects a second candidate word in the second voice query 108.

At step 1016 control circuitry 404 determines a second candidate pronunciation time for the second candidate word, wherein the second candidate pronunciation time is adjusted from the second pronunciation rate to the first pronunciation rate.

At step 1018 control circuitry 404 determines whether the first candidate pronunciation time matches the second candidate pronunciation time.

If at step 1018 control circuitry 404 determines that the first candidate pronunciation time does not match the second candidate pronunciation time, process 1000 optionally continues to step 702 of process 700, step 802 of process 800, or step 902 of process 900.

At step 1020 control circuitry 404 generates a third voice query based on the first voice query 102, wherein the first candidate word in the first voice query 102 is replaced with the second candidate word.

It should be noted that processes 800-1200 or any step thereof could be performed on, or provided by, any of the devices shown in FIGS. 4-7. For example, any of processes 800-1200 may be executed by control circuitry 604 (FIG. 6) as instructed by control circuitry implemented on user equipment 702, 704, 706 (FIG. 7), and/or a user equipment for selecting a recommendation. In addition, one or more steps of processes 800-1200 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-5 could be used to perform one or more of the steps in FIGS. 6-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 500, media content source 516, or media guidance data source 518. For example, a profile, as described herein, may be stored in, and retrieved from, storage 408 of FIG. 4, or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a first voice input inputted at a first pronunciation rate;
   receiving a second voice input inputted at a second pronunciation rate;
   in response to determining that the first pronunciation rate is different from the second pronunciation rate:
      modifying the received first voice input using a matching content of the second voice input to generate a modified first voice input; and
      performing an action based on the modified first voice input.

2. The method of claim 1, wherein the second voice input comprises the matching content and a remaining voice content different from any voice content portion of the first voice input.

3. The method of claim 1, wherein the second voice input comprises only the matching content.

4. The method of claim 1, further comprising:
   receiving user indication that the modified first voice input is incorrect; and
   modifying, in response to the user indication, the received first voice input using a second matching content of the second voice input.

5. The method of claim 1, further comprising:
   after the receiving of the first voice input, generating for output a visual indication of the first voice input,
   wherein the second voice input is received in response to the visual indication.

6. The method of claim 1, further comprising:
   receiving user indication that the modified first voice input is correct; and
   providing a result of a query in response to the user indication, the query comprised in the modified first voice input.

7. The method of claim 1, wherein the action is generating for output a visual indication of the modified first voice input.

8. The method of claim 1, wherein the action is providing a result of a query, the query comprised in the modified first voice input.

9. The method of claim 1, wherein the action is providing a selectable option.

10. A system comprising:
    processing circuitry configured to:
       receive a first voice input inputted at a first pronunciation rate;
       receive a second voice input inputted at a second pronunciation rate;
       in response to determining that the first pronunciation rate is different from the second pronunciation rate:
          modify the received first voice input using a matching content of the second voice input to generate a modified first voice input; and
          perform an action based on the modified first voice input.

11. The system of claim 10, wherein the second voice input comprises the matching content and a remaining voice content different from any voice content portion of the first voice input.

12. The system of claim 10, wherein the second voice input comprises only the matching content.

13. The system of claim 10, the control circuitry further configured to:
    receive a user indication that the modified first voice input is incorrect; and
    modify, in response to the user indication, the received first voice input using a second matching content of the second voice input.

14. The system of claim 10, the control circuitry further configured to:
    after the receiving of the first voice input, generate for output a visual indication of the first voice input,
    wherein the second voice input is received in response to the visual indication.

15. The system of claim 10, the control circuitry further configured to:
    receive a user indication that the modified first voice input is correct; and
    provide a result of a query in response to the user indication, the query comprised in the modified first voice input.

16. The system of claim 10, wherein the action is generating for output a visual indication of the modified first voice input.

17. The system of claim 10, wherein the action is providing a result of a query, the query comprised in the modified first voice input.

18. The system of claim 10, wherein the action is providing a selectable option.

19. A non-transitory computer readable medium comprising:
    instructions that when executed by control circuitry cause the control circuitry to:
       receive a first voice input inputted at a first pronunciation rate;
       receive a second voice input inputted at a second pronunciation rate;
       in response to determining that the first pronunciation rate is different from the second pronunciation rate:
          modify the received first voice input using a matching content of the second voice input to generate a modified first voice input; and
          perform an action based on the modified first voice input.

20. The non-transitory computer readable medium of claim 19, wherein the action is generating for output a visual indication of the modified first voice input.

\* \* \* \* \*